No. 616,165. Patented Dec. 20, 1898.
G. W. DE TUNZELMANN.
CARBON FOR ELECTRIC WELDING.
(Application filed Feb. 25, 1898.)
(No Model.)
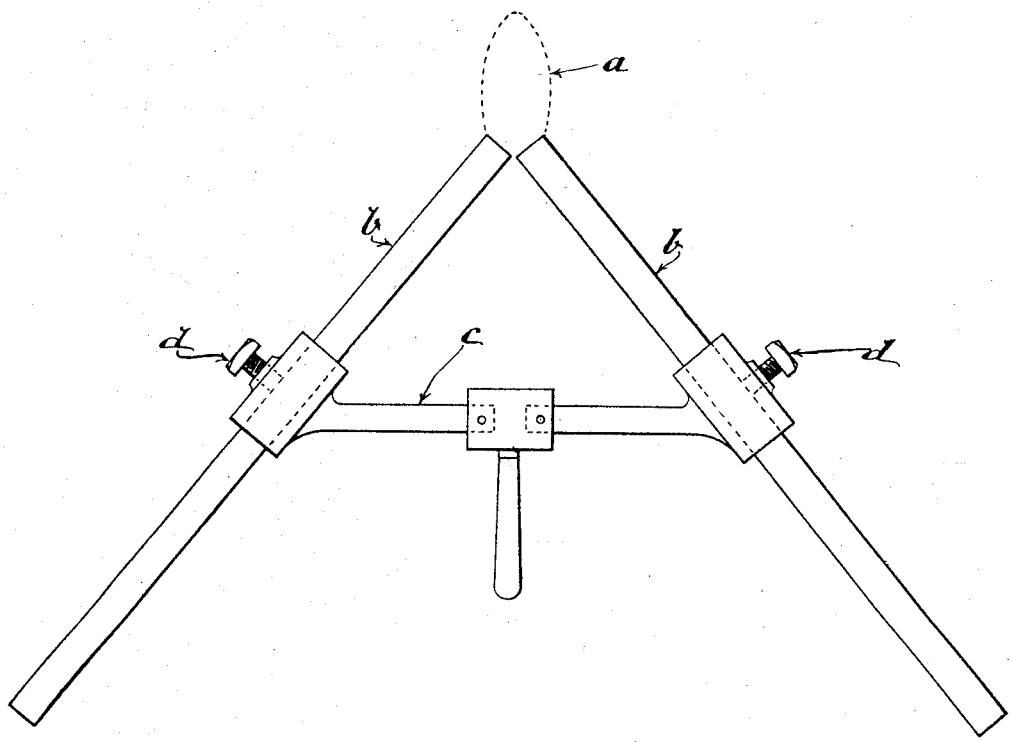

United States Patent Office.

GEORGE W. DE TUNZELMANN, OF LONDON, ENGLAND.

CARBON FOR ELECTRIC WELDING.

SPECIFICATION forming part of Letters Patent No. 616,165, dated December 20, 1898.

Application filed February 25, 1898. Serial No. 671,713. (No model.)

*To all whom it may concern:*

Be it known that I, GEORGE WILLIAM DE TUNZELMANN, a subject of the Queen of Great Britain, and a resident of Earls Court, London, England, have invented certain new and useful Improvements in Carbons for Electric Welding, of which the following is a full, clear, and exact specification.

This invention relates to improvements in or relating to carbons for electric welding, brazing, and the like purposes, the object being to prepare the carbons or electrodes so as to keep the arc as free as possible from free carbon and also to provide an arc having more diffused surface for heating.

It has been found that the presence of free carbon in an arc used for welding or brazing purposes is objectionable. For instance, when welding or brazing iron or steel the free carbon may enter into chemical combination with the parts under treatment or may intermix therewith, and this chemical combination or admixture of carbon with the iron or steel alters the character of the metal or metals under treatment. Again, when using an arc it is very essential that the heat should be as much as possible equally diffused through the arc, so as to avoid the concentration of heat in a small space. I have found that by incorporating a metallic oxid with the carbons I can obtain an arc in which the heat is more equally diffused, owing to the presence of metallic vapor in the arc, and at the same time the presence of free oxygen tends to unite with the excess of free carbon in the arc. I have also found that carbons with which a metallic oxid is incorporated enables me to obtain an arc of greater size than that which is obtained from ordinary carbons, owing to the greater conductivity produced by the presence of the metallic vapor.

It will be readily seen that in welding or brazing it is very essential to obtain an arc in which the heating qualities are equally diffused, so as to obviate the concentration of heat in a small space, thus rendering the arc much more effective when brazing or welding.

I have found it convenient in making the carbons to incorporate with them a mixture of metallic oxid, such as iron; but of course it will be readily seen that there are other oxids which may be used with advantage, according to the substance under treatment. For instance, in some cases I find it convenient to employ oxid of copper.

Another important feature of my invention lies in the fact that I can introduce various metallic vapors into an arc for use when welding metals when required.

Any convenient form of machinery may be employed for the manufacture of the carbons, as the essential feature of my invention is the incorporation with the carbons of a metallic oxid or oxids for the objects before mentioned.

In order that my invention may be fully understood, I will now refer to the annexed drawing, in which the figure is a view showing my carbons in position.

$b$ are the carbons, which are carried in the holder $c$, the dotted line $a$ indicating the position of the arc, $d$ being the terminals or binding-screws.

Having thus described my invention, what I claim, and desire to secure by Letters Patent, is—

An electrode for electric welding, brazing and the like purposes composed of carbon and metallic oxids combined together by admixture substantially as described and illustrated herein.

In testimony that I claim the foregoing I have hereunto set my hand this 16th day of February, 1898.

G. W. DE TUNZELMANN.

Witnesses:
 BENJAMIN CLARK,
 PERCY READ GOLDRING.